Oct. 13, 1925.
E. K. STANDISH
TRANSMISSION MECHANISM
Filed Jan. 3, 1920
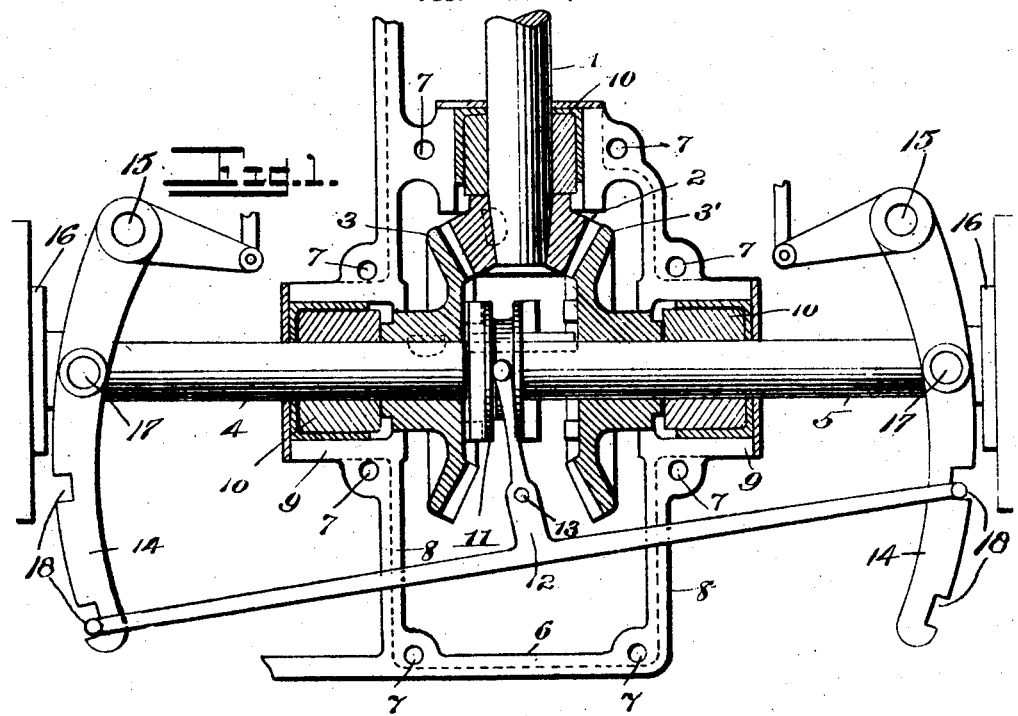
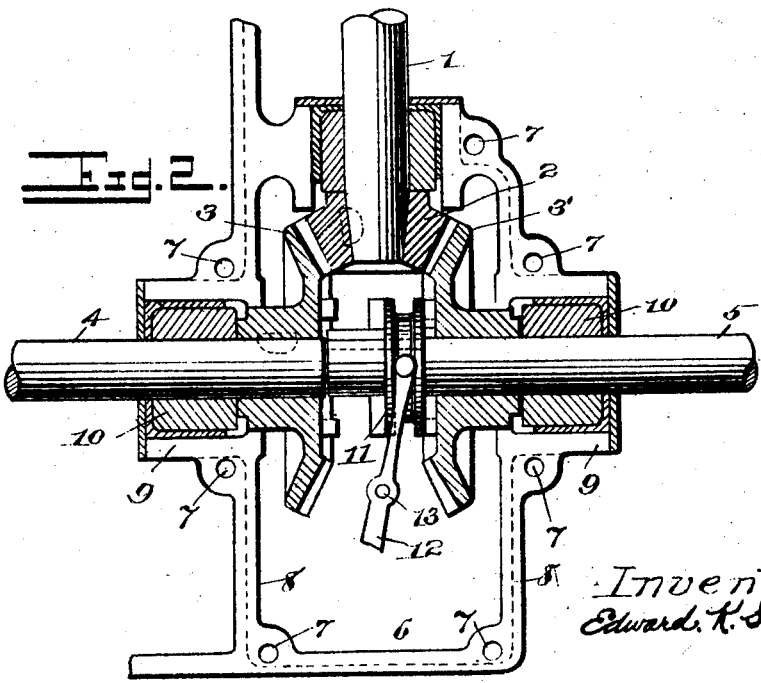
Inventor
Edward K. Standish Patented Oct. 13, 1925.

1,556,971

UNITED STATES PATENT OFFICE.

EDWARD K. STANDISH, OF STOUGHTON, MASSACHUSETTS.

TRANSMISSION MECHANISM.

Application filed January 3, 1920. Serial No. 349,265.

*To all whom it may concern:*

Be it known that I, EDWARD K. STANDISH, a citizen of the United States, and a resident of Stoughton, county of Norfolk, State of Massachusetts, have invented an Improvement in Transmission Mechanisms, of which the following is a specification.

This invention relates to a novel construction of transmission mechanism which, while designed particularly for use in connection with track-laying tractors, is, of course, applicable for use in other machines or vehicles.

The object is to provide a transmission mechanism including two alined drive-shafts and mechanism whereby said shafts may be rotated in the same direction, or in opposite directions.

With this object in view, the invention resides in a transmission mechanism comprising a transmission or power-shaft, carrying a bevel pinion, two alined drive-shafts, one thereof carrying a fast and the other thereof a loose gear, both meshing with said pinion, and a clutch on one of said drive-shafts and interposed between said gears, and engageable with either thereof, or movable to neutral position, so as to be out of engagement with both.

The invention is disclosed, in its preferred form, in the accompanying drawing, forming part of my specification. Briefly described:

Figure 1 is a fragmentary view, in partial section, of the mechanism constituting my invention, the clutch being shown as engaged with the gear of one of the two alined drive-shafts; and Figure 2 is a similar view, showing the clutch as engaged with the gear of the other drive-shaft.

Referring, now, in detail to the drawing: 1 designates a transmission or power-shaft carrying, fast thereon, a pinion 2 meshing with a gear 3 fast on a shaft 4 and with a gear 3' loose on a shaft 5, said shafts 4 and 5 being alined, as shown.

Said shafts 1, 4 and 5 are suitably supported for rotary movement. In this instance, a bracket 6 is provided, which is apertured at 7 for the reception of bolts, or the like (not shown), to fasten the bracket to the tractor-frame. The bracket is provided with arms or flanges 8, 8, having offset portions 9, 9, 9, for the reception of packing 10, 10, 10 for the shafts.

Keyed to and slidable on the shaft 5 is a clutch 11 adapted to be thrown into engagement with either of said gears 3 and 3', or to be moved to a neutral position therebetween, so as to be out of contact with both.

The clutch is controlled in any suitable manner, as by a lever 12 fulcrumed at 13.

In operation, assuming the power-shaft 1 to be driven clockwise and clutch 11 to be in engagement with gear 3, shafts 4 and 5 are driven forward, whereby both tracks of the track-laying tractor are driven forward. If, however, the clutch 11 is moved out of engagement with the gear 3 and into engagement with the gear 3', shaft 4 is driven forward and shaft 5 driven backward, thereby turning the tractor to the right on its pivot. Reversing the shaft 1 reverses all of above movements, as is obvious.

If the clutch 11 is out of engagement with both gears 3 and 3', the right hand track will remain stationary and the left hand tract will move forward or backward depending on the direction of rotation of the driving shaft 1.

Normally, shaft 1 will be connected through a change gear box with the driving engine or motor, and as the change gear box normally contains forward and reverse gears the direction of turning can be regulated by shifting gears.

As generally constructed the shafts 4 and 5 will each drive the tractor treads through a clutch of the type which may be slipped and thus used to steer the machine.

It is therefore contemplated that the clutch lever 12 may be interlocked with the steering clutch levers 14, 14 so that in order to move the clutch lever 12 and the clutch 11 the steering clutches must both be released, thus preventing shocks to the clutch 11.

These clutches may be slipped or thrown by suitable mechanism, the specific means for this purpose herein shown comprising levers 14—14, fulcrumed at 15—15 and connected to their respective clutches 16 as at 17. The levers are suitably curved and are provided with notches 18 in which the ends of the cross arm of lever 12 are adapted to rest. As will be understood the curvature of the levers is such that the lever 12 will not swing freely until the levers 14 have both been rocked to release their clutches.

It will thus be seen that I have devised a transmission mechanism of the maximum simplicity, wherein it is necessary to employ not more than three gears to accomplish the results stated, two of said gears being constantly in mesh with the third. The essence of my invention, therefore, resides in a transmission mechanism utilizing three gears, only, to rotate the shafts 4 and 5 simultaneously in the same direction, or simultaneously in opposite directions.

Having thus fully described my invention, what I claim as new and desire to secure by Letters Patent is:

1. In a transmission mechanism, a drive shaft carrying a gear fast thereon, an alined drive shaft carrying a gear loose thereon, a power shaft carrying a pinion meshing with said gears, and a clutch keyed to and slidable on the alined drive shaft and engageable with either of said gears to rotate said drive shafts in the same direction or in opposite directions, or movable out of engagement with both of said gears to rotate the first mentioned drive shaft and leave the other drive shaft free.

2. A transmission mechanism, embodying a drive shaft carrying a gear fast thereon, an alined drive shaft carrying a gear loose thereon, a power shaft having a gear fast thereon meshing with the aforesaid gears, a clutch feathered on the alined shaft and adapted for selective engagement with the fast or loose gear on the drive shafts, steering slip clutches on the drive shafts, means for throwing said clutches, and means for throwing the first mentioned clutch, said means interlocking with the throwing means for the steering clutches, whereby movement of the first mentioned clutch is prevented until the steering clutches are released.

EDWARD K. STANDISH.